United States Patent Office 2,920,318
Patented Jan. 5, 1960

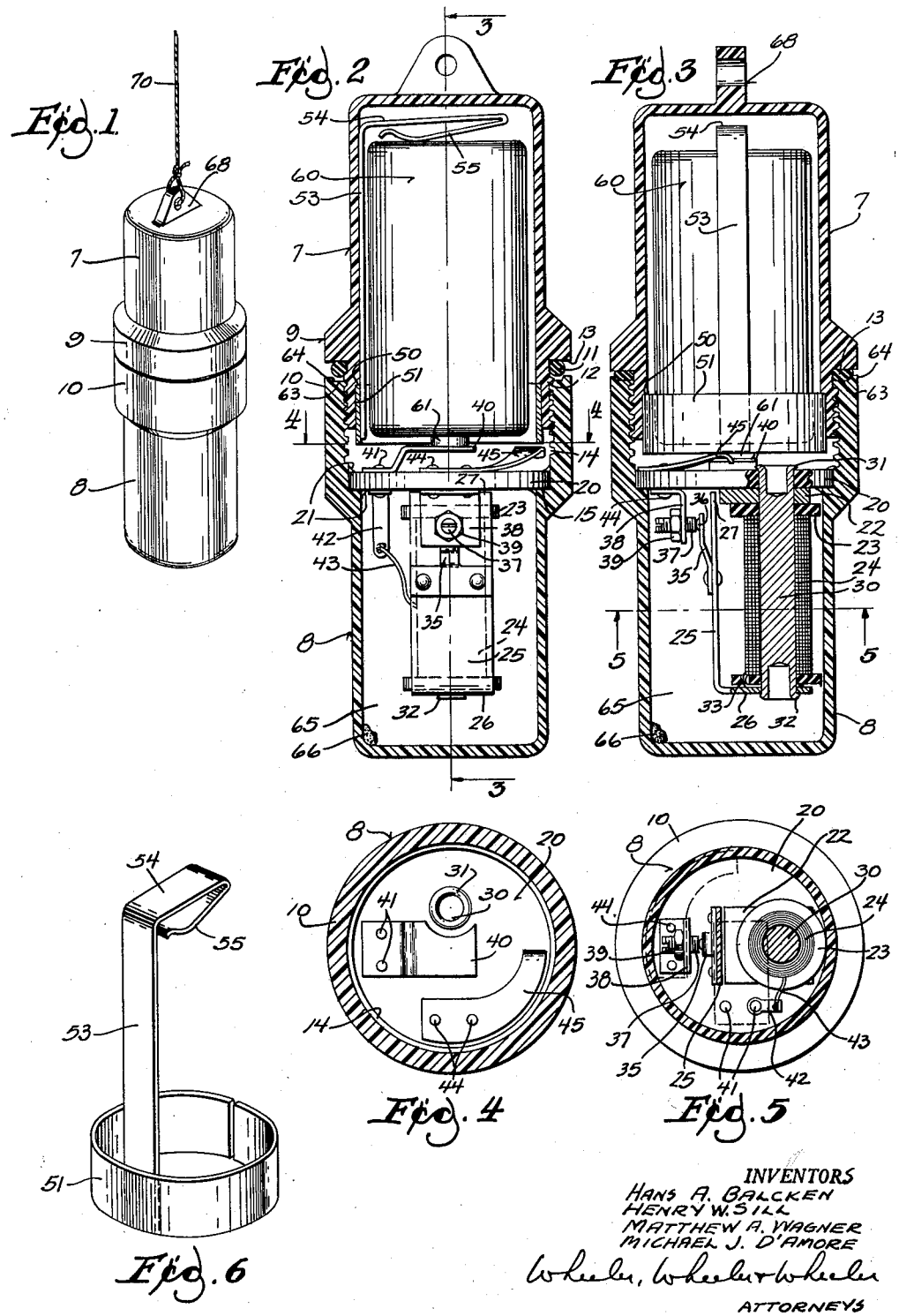

2,920,318
FISH CALLER

Hans A. Balcken, Wauwatosa, Henry W. Sill, Milwaukee, Matthew A. Wagner, West Allis, and Michael J. D'Amore, Milwaukee, Wis., assignors, by mesne assignments, to Birchkraft, Inc., Milwaukee, Wis., a corporation of Wisconsin Application February 14, 1957, Serial No. 640,152

9 Claims. (Cl. 340—394)

This invention relates to a fish caller.

U.S. Patent No. 2,577,229 discloses a device of this character in which a buzzing sound, desirably of relatively high pitch, is produced in the water in the vicinity of a lure of any kind to attract fish into the area. The present device uses a two-part plastic case which is completely resistant to corrosion in any water in which fish are found, and has a buzzer mounted on a partition web which spans one unit of the case and is hermetically sealed so that water cannot, under any circumstances, leak into the buzzer compartment.

The other unit of the case provides a battery compartment. The partition web comprises radially spaced spring terminals, one of which is engaged by the center post of a battery. The central spring terminal with which the battery center post is engaged has sufficient resilience to maintain such engagement even when the upper unit of the case is partially unscrewed from the normal full seated engagement with the lower unit. This holds the bottom of the battery against a spring conductor which has a portion at the top of the case and which extends downwardly beside the battery to a contact ring which encircles the battery in a counterbore of the case, the ring abutting a shoulder with which the upper unit of the case is provided. When the upper unit of the case is partially unscrewed, this ring is free of engagement with the outer spring contact mounted on the partition of the lower unit of the case. However, as the upper unit is turned on its screw threaded connection to a sealing engagement with the lower unit, the contact ring carried by the upper unit engages the outer spring contact of the lower unit to complete a circuit which energizes the buzzer.

The arrangement described not only makes it convenient to use a case which is made of a non-conducting material, but it results in a very satisfactory switching arrangement, and one in which the battery is securely held in all positions of the upper and lower case sections, the battery being instantly removable for replacement when the case sections are completely separated.

The buzzer comprises a core shaft which is riveted at its ends to engage the mounting partition and the armature spring, the winding spool and pole plate being thereby clamped securely. This vibrator organization is extremely simple and requires a minimum number of parts. Yet the vibrations are transmitted through solid material to the case, whereby the sound emitted to the water is relatively loud.

In the drawings:

Fig. 1 is a view in perspective of an assembled fish caller embodying the invention.

Fig. 2 is an enlarged detail view in vertical axial section showing the casing parts partially separated to open the circuit to the vibrator.

Fig. 3 is a view in vertical axial section on the line 3—3 of Fig. 2.

Fig. 4 is a view in transverse section on the line 4—4 of Fig. 2.

Fig. 5 is a view in transverse section on the line 5—5 of Fig. 3.

Fig. 6 is a view in perspective of the spring conductor and circuit breaking switching contact ring used to engage and embrace the battery.

The casing is desirably made of plastic and comprises an upper part 7 and a lower part 8 in screw threaded connection. The parts have portions 9 and 10 of increased radius at the center of the device, the portion 9 being provided with male threads and the portion 10 being provided with female threads as clearly appears in Fig. 3. A seal is provided by the O-ring 11 which encircles casing section 7 between its threads 12 and the overlying shoulder 13. The threads 14 of the lower section 8 are formed in a counterbore which terminates at shoulder 15 upon which the waterproof plastic partition 20 seats. Adhesive is desirably used to provide an hermetic seal of the partition 20 and the lower case unit 8. Under seating pressure, the adhesive is slightly extruded from the seal to form the fillets 21.

The vibrator is mounted on partition 20. It comprises a single pole plate 22, a winding spool 23 carrying electrical winding 24 and a magnetizable armature 25 which has an arm 26 extending across the end of the spool remote of the pole 22, and a resilient arm extending beside the spool to a terminal portion at 27 which is in immediate proximity to the pole plate 22. While the entire armature 25 is normally made of magnetic material, it will be apparent that only the terminal portion 27 thereof is essentially responsive to the attraction of pole 22.

The parts above described are held in assembly by a core bar 30 which extends through partition 20 and is riveted at 31 in engagement with the upper surface of the partition, the lower end of bar 30 being riveted at 32 in engagement with the arm 26 of the armature 25. Under the pressure developed by riveting the ends of the core 30, the arm 26, spool 23 and pole plate 22 are maintained in rigid assembly. As a convenient means of providing an electrical connection between the winding 24 and the armature 25, the end 33 of the armature winding is interposed between the arm 26 of the armature and the lower end of the spool in the manner shown in Fig. 3.

Armature 25 is provided with a spring contact arm 35 which carries a contact 36 movable to and from engagement with the contact screw 37. This screw is threaded through a mounting bracket 38 riveted to partition 20 and dependent therefrom. The lock nut 39 holds the screw in the position to which it is adjusted. Within limits, the screw adjustment will regulate the pitch resulting from the frequency of oscillation of the armature 25, a relatively high pitch being preferred, although this does not appear to be critical from the standpoint of calling fish. The armature is biased ouwardly to the position shown in Fig. 3 so that when no current is flowing through the coil 24, the contact 36 will engage the contact screw 37. When the armature is attracted by pole 22, the contact 36 will move away from screw 37, thus momentarily breaking the circuit.

On the upper side of the partition disc 20 there are radially offset contact springs. The central contact spring 40 is fixed to the partition disc 20 by means of rivets 41 which provide electrical connection through the partition disc to an arm 42 to which is soldered a lead 43 to the winding 24. It will be recalled that the opposite lead 33 from that winding is connected to the armature 25.

The rivets 44, which anchor the bracket 38 of the terminal screw 37, extend through the partition to provide an electrical connection between bracket 38 and the outer contact spring 45, this spring being set at a level slightly below that of spring 40 as clearly appears in Fig. 2.

The upper casing unit 7 has a counterbore within its screw threaded lower end which terminates in a shoulder 50 abutted by a contact ring 51, the lower margin of which projects slightly from the dielectric shell or upper unit 7 of the casing. With this unit slightly unscrewed from the lower unit in the relative position of the parts shown in Fig. 2, the ring 51 will be slightly spaced from contact spring 45. In the position of the parts shown in Fig. 3, the lower margin of ring 51 is engaged with spring 45, and the casing is tightly sealed by clamping engagement of the sealing ring 11 beneath shoulder 13.

A conductor strip 53 soldered or otherwise connected with the contact ring 51 extends upwardly along the inner periphery of the upper casing unit 7 and has an arm portion 54 extending across the top of this unit and bent back upon itself to provide a spring contact 55. The casing unit 7 is of such dimensions as to receive a dry cell battery 60 in an inverted position, whereby its base terminal engages and makes good contact with the resiliently yieldable contact portion 55 of conductor 53.

The center terminal 61 of the inverted battery rests upon and makes contact with the spring contact 40, this contact being yieldable but sufficiently stiff to provide adequate support for the battery against such downward thrust as is developed by the relatively lighter spring contact 55. Thus, with the parts in the positions shown in Fig. 2, the weight of the battery plus the downward thrust of spring 55 is wholly sustained by the yieldable contact 40. Although connections to terminals at both ends of the battery are now complete, no current will flow to the vibrator by reason of the fact that the ring contact 51 is clear of the contact spring 45.

When the upper unit of the casing is screwed down from the Fig. 2 position to that of Fig. 3, most of the displacement will be absorbed in the spring 55 rather than the spring 40. The contact ring 51 ultimately engages contact spring 45 to close the circuit to the vibrator which thereupon commences to emit its characteristic hum. At about the same time, the O-ring 11 is clamped by shoulder 13 of the upper casing unit 7 against the seat provided at 63 on the upper end of lower casing 8. This seat is encircled by a terminal annular flange 64 in confining relation to the O-ring, whereby a tight seal is effected. Even without the O-ring, however, leakage into the casing is almost impossible by reason of the relatively close fit and considerable extent of the plastic threads of the upper and lower casing units.

To avoid any possible condensation in the vibrator chamber 65, as a result of immersion of the caller in water of low temperature, any desired desiccant is introduced into chamber 65 as indicated at 66, prior to the sealing of such chamber.

In order to adapt the device for convenient use, the upper unit 7 of the casing is desirably provided at 68 with an integral ear having an aperture to which the supporting line 70 may be tied.

What is claimed is:

1. In a water submergible fish caller, a pair of hollow casing units in detachable connection, a partition spanning the resulting casing and subdividing it into a battery compartment and a vibrator compartment, the battery compartment being accessible upon the separation of said units, and the partition being in hermetically sealed engagement with other of said units to hermetically seal the vibrator compartment against water leakage, a vibrator in the vibrator compartment, and electrical terminals on the partition for electrical connection between the compartments through the hermetically sealed partition.

2. The device of claim 1 in which the said terminals are radially offset on the partition, one of them being adapted for direct battery engagement, the unit of said casing in which the battery compartment is provided having a contact spring, a conductor extending along the side of the battery in the last mentioned unit and a battery-encircling contact ring connected with the conductor and movable to and from engagement with the radially outermost terminal of said partition as the respective units of said casing are engaged and disengaged to selectively open and close the circuit to the vibrator.

3. The device of claim 2 in which the casing unit which provides the battery compartment has a counterbore providing a shoulder on which the ring is disposed, the said units having complementary threads for effecting connection and disconnection of said units to make and break the circuit between said ring and the outermost terminal of said partition and to expose the battery for replacement.

4. The device of claim 3 in further combination with an O-ring providing a seal effective between said units in the threaded engagement thereof, one of said units having a portion encircled by said ring and provided therebeyond with male threads, the other portion being provided with female threads and a terminal seat having a confining flange.

5. A water submergible fish caller comprising a plastic casing which includes a battery confining unit and a vibrator confining unit, the said units having complementary male and female threads in detachable connection, each of said units being provided adjacent its threads with an internal shoulder, a contact ring seated against the shoulder of the battery confining unit and projecting beyond said unit, a conductor extending lengthwise of the battery confining unit and provided at the end thereof with an inwardly extending contact spring, a watertight partition seated against the shoulder of the vibrator confining unit and in hermetically sealed connection therewith, contacts mounted on the partition and including a relatively central battery engaging contact and an outer contact at a slightly lower level positioned to be engaged by said ring in the course of the relative movement of said units toward full threaded engagement, and vibrator means wholly mounted on said partition and including a magnet having a pole and a winding, an armature movable to and from the pole, and circuit controlling means having contacts opened and closed in the course of armature movement to de-energize and energize said winding, one of said contacts being connected through the partition with one of the terminals, and said winding having a connection through the partition with another terminal.

6. The device of claim 5 in which the magnet comprises a riveted core extending through the partition and through the pole and winding, said winding having a supporting spool and the armature having an arm engaged between said core and one end of said spool, the other end of said spool being clamped by said core against the pole, the latter being clamped against the partition.

7. In a fish caller, the combination with a shell providing a vibrator compartment, of a partition closing the shell above the compartment, a core bar anchored to the partition and depending therefrom, a polar plate against the under surface of the partition and through which the core bar extends, a spool threaded upon the core bar and in pressure engagement with said plate, a winding on the spool, an armature extending lengthwise of the spool and having an arm extending across the end of the spool remote from said plate and through which said bar extends, said bar having an upset end engaged with the armature arm to maintain said arm and spool and plate in rigid assembly on said bar, the vibrator including a contact bracket having a relatively fixed contact and the armature having a relatively movable contact which engages and is disengaged from the fixed contact in the course of armature vibration, the said contacts being in series with the winding on said spool to effect such vibration when the winding is energized through said contacts.

8. A device of the character described comprising a casing having two parts in threaded connection, a vibrator in one of said parts, a contact carrier supporting the vibrator and having contacts in electrical connection with the vibrator, the other part of the casing comprising a battery housing, a battery encircling ring contact having a battery-engaging terminal and mounted in the last mentioned part of the casing in a position to be movable to and from one of the contacts first mentioned to selectively open and close the circuit to the vibrator in the course of movement of said casing parts upon their threaded connection.

9. The device of claim 8 in which the casing part that provides the battery housing has a counterbore and a shoulder, the ring contact being disposed in the counterbore and seated against the shoulder and having a conductor extending along the side of the last mentioned casing part to the end thereof remote from the ring contact and there provided with the aforesaid terminal, the battery receivable in said last mentioned housing parts having contacts at its opposite ends, the said terminal being adapted to engage one end of the battery, and one of the contacts first mentioned being adapted to engage the opposite ends of the battery.

References Cited in the file of this patent
UNITED STATES PATENTS

| | | |
|---|---|---|
| 1,304,214 | Smith | May 20, 1919 |
| 1,898,394 | Ridel | Feb. 21, 1933 |
| 2,577,229 | Carnes | Dec. 4, 1951 |
| 2,784,399 | Smith | Mar. 5, 1957 |